Sept. 8, 1959    D. B. STILWELL    2,902,954
DRIVING MECHANISM FOR SINGLE AND DOUBLE FEED HOPPERS
Filed Sept. 19, 1955    3 Sheets-Sheet 1

INVENTOR:
DONALD B. STILWELL
BY Eaton + Bell
ATTORNEYS

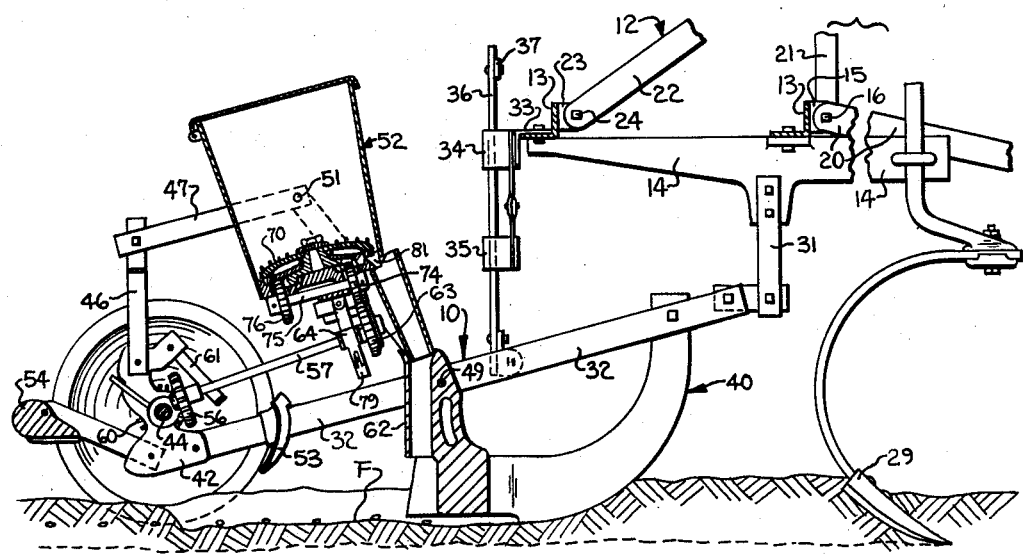
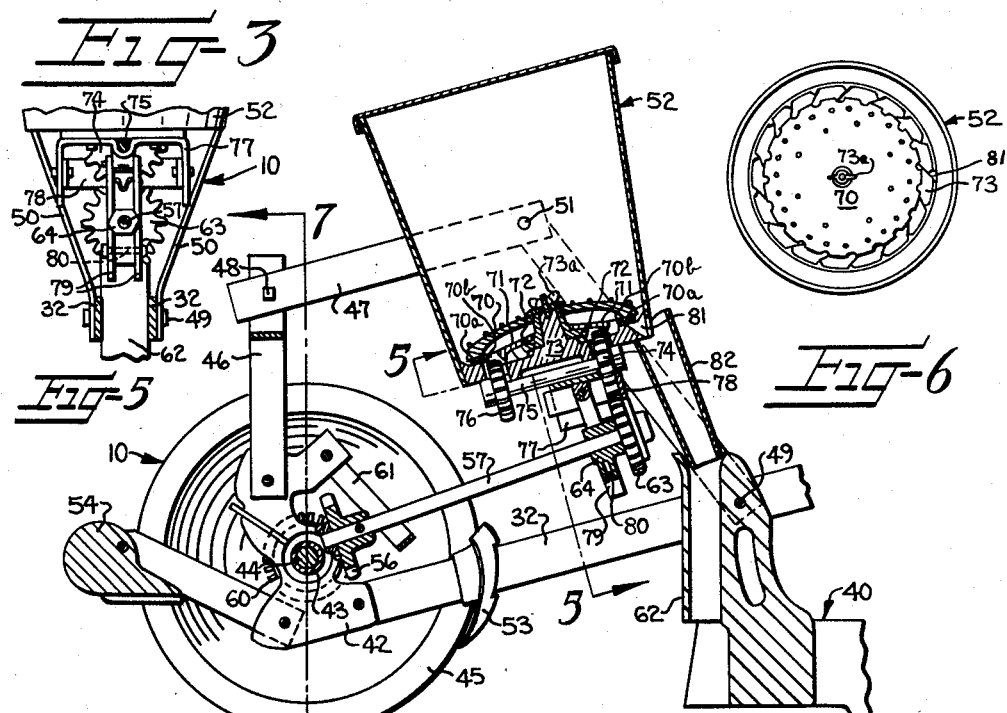

Sept. 8, 1959        D. B. STILWELL        2,902,954
DRIVING MECHANISM FOR SINGLE AND DOUBLE FEED HOPPERS
Filed Sept. 19, 1955        3 Sheets-Sheet 3
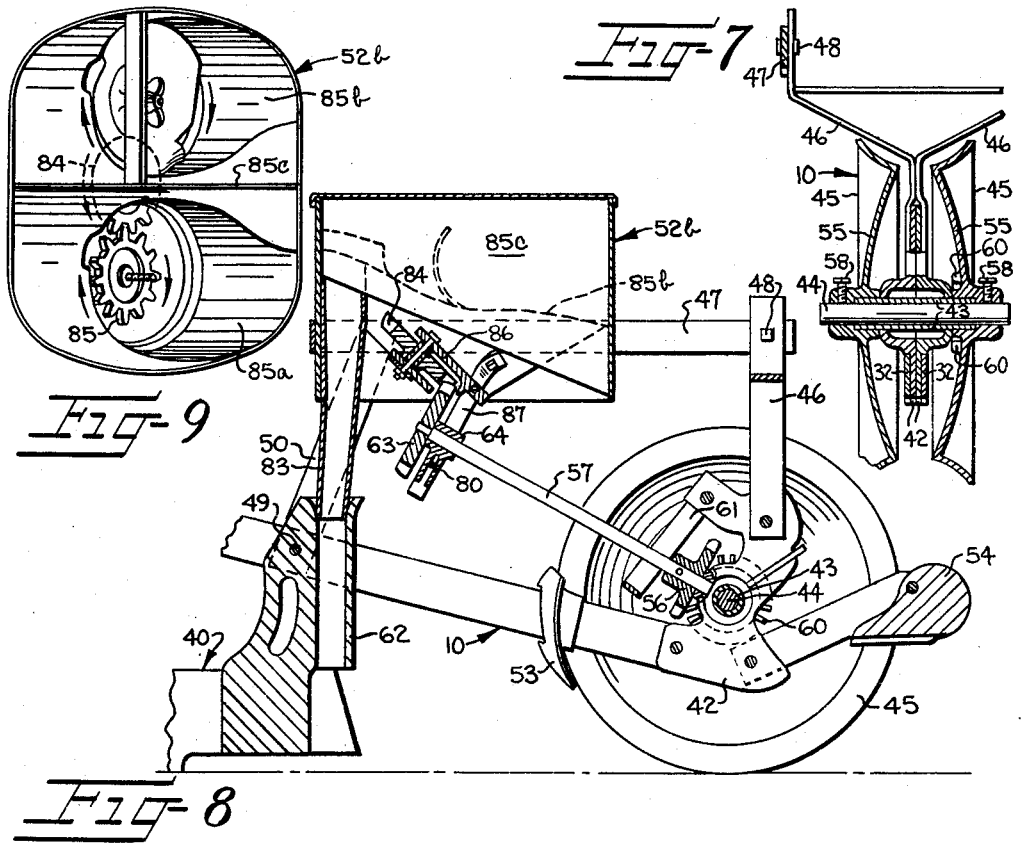
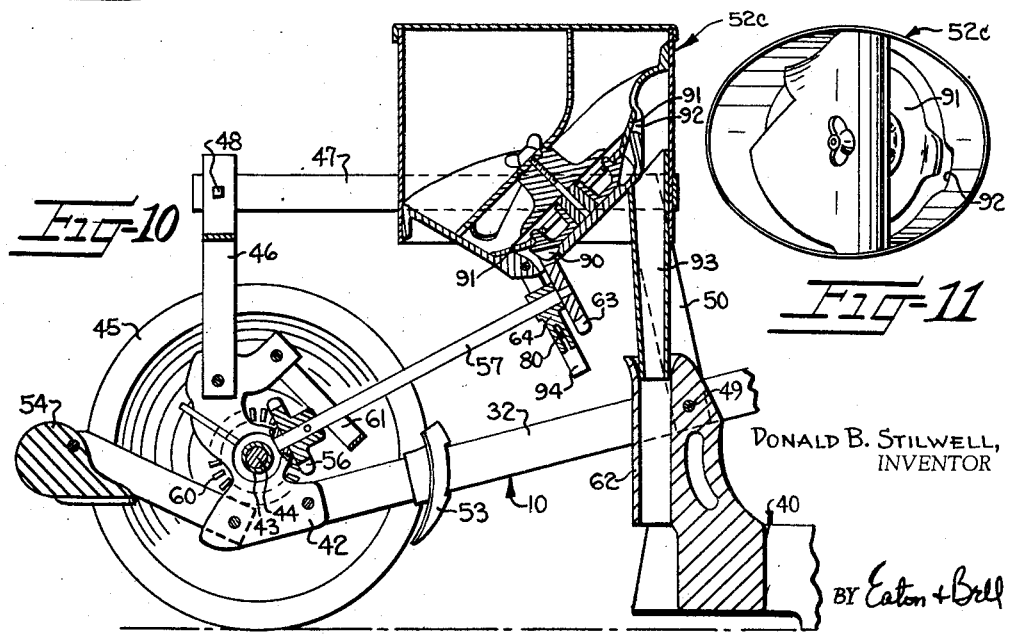
Donald B. Stilwell,
INVENTOR
By Eaton + Bell
ATTORNEYS

United States Patent Office 2,902,954
Patented Sept. 8, 1959

2,902,954

DRIVING MECHANISM FOR SINGLE AND DOUBLE FEED HOPPERS

Donald B. Stilwell, Charlotte, N.C., assignor to Cole Manufacturing Company, Charlotte, N.C., a corporation of North Carolina Application September 19, 1955, Serial No. 535,106

1 Claim. (Cl. 111—52)

This invention relates to seed planters and more particularly to the driving mechanism for driving the seed hoppers to permit the seeds to flow therefrom.

It is an object of the invention to provide a seed hopper driving mechanism wherein the same will readily feed seeds from a single hopper or a double hopper or a hopper having a generally horizontal bottom wall or a sloping bottom wall.

It is also an object of this invention to provide a novel driving mechanism for the seed hoppers on a planter whereby various types of single and double hoppers, such as hoppers for cotton lint seed, de-linted cotton seed, corn, peas and the like may be readily interchanged on the planting device. Heretofore, planters have been designed to plant particular types of seed such as cotton, corn, peas or the like and each of the hoppers has been designed according to the type and size of the seed to properly feed the seed therefrom in proper spaced relation. With the improved driving mechanism for the seed hopper of the planting device, instead of purchasing a planting device for single hoppers and an additional planting device for double hoppers, as has been the case heretofore, the same planting mechanism may be used by merely interchanging the hoppers thereon. It is apparent that this results in large savings to the farmers because instead of purchasing an additional seed planter, the farmer only has to buy the desired number and types of seed hoppers and feed plates.

It is a further object of the invention to provide a novel method for changing the driving mechanism for driving a single feed hopper to drive a double feed hopper.

Some of the objects of the invention having been stated, other objects will appear as the description proceeds when taken in connection with the accompanying drawings, in which—

Figure 3 is a vertical section taken on line 3—3 of Figure 2 with parts broken away for purposes of clarity showing a cotton lint seed type of hopper;

Figure 4 is an enlarged view of the left-hand portion of Figure 3 showing the seed hopper and the driving mechanism therefor;

Figure 5 is a vertical section taken substantially on line 5—5 of Figure 4 showing the mounting means for the seed hopper and the hopper drive shaft;

Figure 6 is a top plan view of the cotton lint seed type of hopper of Figure 4 omitting the cover;

Figure 7 is a vertical section taken along line 7—7 of Figure 4 with parts broken away and showing the ground or presser wheels and the manner of securing the same to the seed planter frame;

Figure 8 is a view similar to Figure 4 but looking from the opposite side and showing a corn or pea type of double seed hopper mounted on the planting device for concurrently feeding two different types of seeds;

Figure 9 is a top plan view of the double seed hopper of Figure 8;

Figure 10 is a view similar to Figure 4 showing a single-feed corn, pea or de-linted cotton type of seed hopper;

Figure 11 is a top plan view of the feed hopper of Figure 10.

Figure 1:
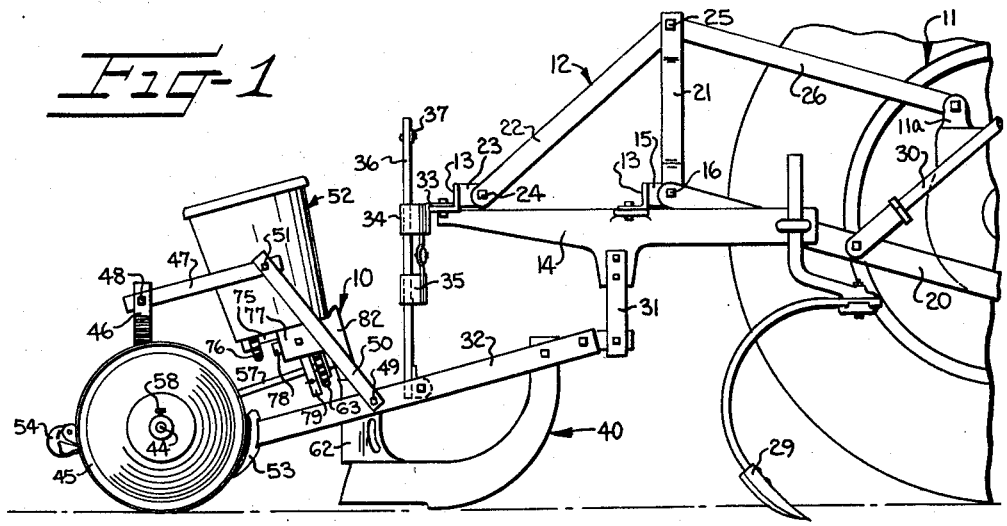
Figure 1 is a side elevation of a seed planter attached to a tractor with a seed hopper for feeding seeds therefrom mounted thereon.

Referring more specifically to the drawings, the numeral 10 broadly designates a seed planter secured to the rear end of a tractor 11. A connecting framework broadly designated at 12 is provided for connecting the front end of the planting device 10 to the rear end of the tractor 11 so the same may be pulled by the tractor and front portions of the planting device may be raised and lowered. When the device is to be raised to non-operating position, it may be transported from place to place, and it may also be raised when turning around after planting a row or rows of seeds.

The connecting framework 12 comprises a pair of spaced transverse frame members 13 (Figures 1 and 2) which are adjustably secured to a pair of spaced longitudinal frame members 14. A pair of lugs or abutments 15 extend forwardly from the front transverse frame member 13 and have the rear ends of a pair of spaced lower links 20 pivotally connected thereto. The other or front ends of lower links 20 are suitably connected to a portion of the tractor 11, not shown, for pulling the seed planter device. A pair of angle braces 21 are provided with their lower ends suitably connected to the abutment members 15 by suitable means such as bolts 16 and their upper ends are connected to the upper ends of a pair of spaced bracing members 22 which have their lower ends connected to an abutment 23 on the rearmost transverse member 13 by any suitable means such as a bolt 24.

A stabilizing rod or link 26 is provided with its upper end connected, by a bolt 25, to the pairs of bracing members 21 and 22 and its lower end connected to a pair of ears or abutment members 11a provided on the rear end of the tractor 11. A pair of elevating rods 30 are provided with their lower ends connected to the pair of connecting rods 20 and their upper ends connected to elevating mechanism on the tractor 11, not shown, for raising the seed planter 10. A pair of furrow forming devices 29 are spaced forwardly of the seed planter 10 and are suitably secured to the members 14.

A pair of downwardly extending horizontally spaced members 31 have their upper ends connected to the longitudinal frame members 14 and their lower ends are each connected to a frame or carriage 32 for the corresponding seed planter 10. Each frame or carriage 32 is also connected to the lift mechanism of the tractor by a bracket 33 connected to the rearmost transverse member 13 and to which is connected an upper guiding block 34 which is connected to a lower guiding block 35. A vertically positioned sliding rod 36 is guided by the guiding blocks 34, 35 and has a stop 37 adjacent its upper end to engage the upper surface of the upper guiding block 34. The lower end of the sliding rod 36 is connected to a medial portion of the frame or carriage 32 for elevating the front end of the seed planter 10.

It will be observed in Figure 1 that, when the elevating rods 30 are moved upwardly by mechanism, not shown, on the tractor 11, the frame assembly 12 will also be moved upwardly along with the front end of the seed planter 10 and, upon engagement of the upper surface of the guiding block 34 with the stop member 37, the entire planter 10 is raised.

A runner boardly designated at 40 is mounted on each carriage 32 and spaced rearwardly of each of the furrow forming defices 29. Each runner 40 is substantially V-shaped to separate the loose earth dug by the furrow forming defices 29 to provide a bed for the seeds to be planted.

Figure 2:
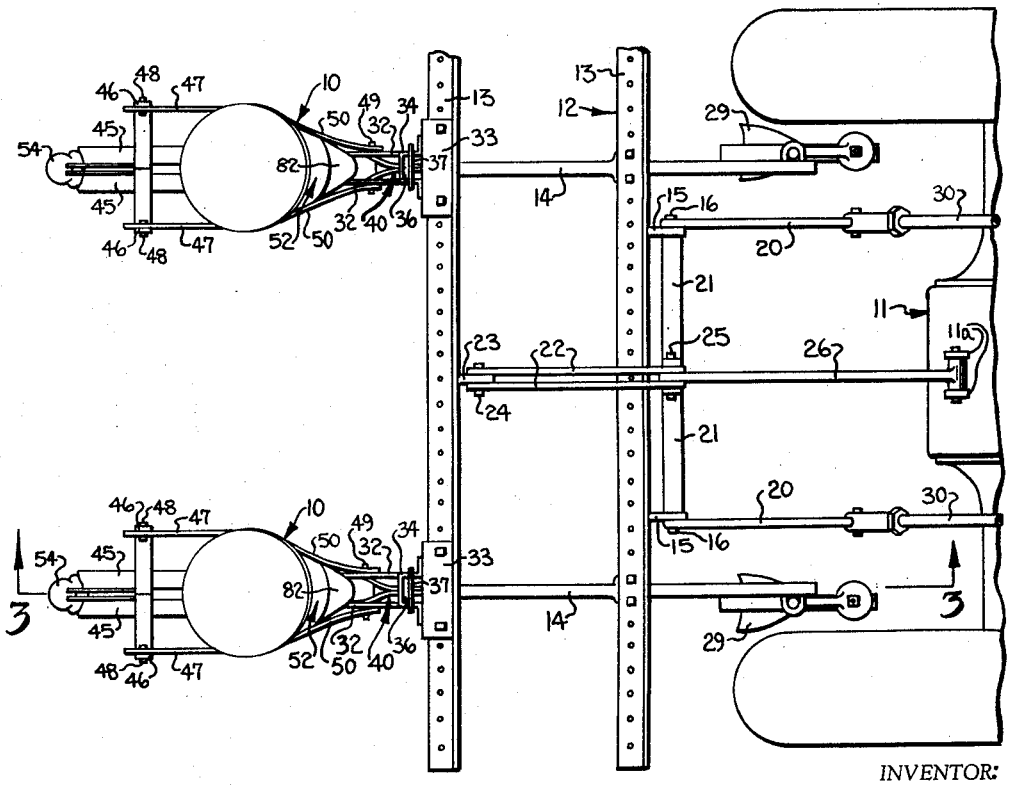
Figure 2 is a top plan view of Figure 1 with parts broken away and showing the manner in which the seed planters are positioned in spaced relation to plant multiple rows at a time.

The seed planter carriage or frame 32, as will be observed in Figures 1, 2 and 7, comprises a pair of rearwardly converging members. Engaging opposite sides of the rearward ends of these members 32 are bracket members 42 which are provided with a sleeve bearing 43 through their hub portions in which is received an axle 44 for suitably supporting a pair of spaced pressing, furrow covering or ground wheels 45 suitably secured to the shaft as by bolts 58.

To the upper portions of the brackets 42 are connected rear hopper supporting members 46 having spaced upper end portions to which are secured as by bolts 48, the rear ends of a pair of hopper side braces 47 having their forward ends connected to a pair of front hopper braces 50 which have their lower ends connected to the chassis or carriage 32 by bolts 49. Bolts 51, connecting the pair of side hopper braces 47 to the front hopper braces 50, also connect opposite sides of a seed or feed hopper 52.

Between the spaced rear portions of the side members forming the runner 40 is provided a seed passageway 62 for guiding the seeds from the hopper 52 into the furrow F as shown in Figures 3 and 4. Front and rear scrapers 53 and 54, are provided suitably secured to the frame 32 and brackets 42, respectively, to aid in preventing any debris, such as tree limbs or rocks from becoming lodged between the pairs of spaced pressing wheels 45 and thus interfering with the driving means for the seed hopper to be presently described.

As will be observed in Figure 7, the pair of spaced wheels 45, by reason of their concave peripheries, form a cover for the seeds to be planted, by moving earth over the seeds. Central portions 55 of said wheels 45 are formed outwarly to provide a sufficient distance between the proximal inner surfaces thereof to accommodate a driving gear 56 (Figures 3 and 4) fixed on a drive shaft 57. It will be observed in Figures 3, 4 and 7 that one of the wheels 45 is provided with lugs or teeth 60 on its inner surface for meshing with the teeth of the gear 56 mounted on the drive shaft 57 for imparting movement to the mechanism in the seed hopper 52 to be later described.

As will be observed in Figure 4, the lower rear end of the drive shaft 57 is journaled in an opening in the hub portion of the pair of bracket members 42 and a bracket member 61 is secured to the bracket members 42 for contacting the hub of the gear 56 to maintain the lower end of the shaft 57 in the opening provided therefor. The upper end of the shaft 57 is provided with a gear 63 and is supported by a shaft bearing block 64 having a bifurcated lower end which is secured by a bolt 80 to a downwardly extending bifurcated member 79 supported from a bracket 77 on the hopper 52 so the shaft 57 by loosening the bolt 80 may be readily adjusted upwardly or downwardly depending on what type of seed hopper is employed on the planting device.

All of the mechanisms described heretofore are common to the various types of feeding hoppers illustrated, which are now to be described in detail.

In Figures 1 through 6 one form of hopper 52 is illustrated which is known as a cotton lint-seed hopper having upper and lower seed plates 70, 71, respectively, for feeding the seed of the hopper through an opening 81 into a seed guide chute 82 and into the passageway 62 formed behind the runner 40. The upper seed plate 70 rotates slightly above and in an opposite direction to a plate 70a which is driven by the lower seed plate 71 in a manner shortly to be explained and which plate 70a is in the form of a ring provided with spaced openings therein through which the seed is permitted to pass into the guide chute 82. The plates 70 and 71 are driven in opposite directions to each other to prevent the seed from clogging up in the hopper 52 and to properly feed the seed into the opening 81 of the hopper 52.

A gear 72 surrounds an upper boss portion provided on a stationary base member 73 and the hub portion of the gear 72 lockingly engages the upper seed plate 70 to carry the same therewith when the gear is rotated on the base 73 by means shortly to be explained. The plate 70 is shown as provided with a central rectangular opening to lockingly engage the hub portion of gear 72. A wing nut 73a and washer, or any other suitable means, are provided for preventing the upper seed plate 70 from disengaging the hub portion of the gear 72.

It will be observed in Figure 4 that the gear 72 is free to revolve about the boss portion of the base member 73. The lower seed plate 71 rests against the upper surface of the gear 72 and is rotated in the opposite direction thereto by a gear 76 fixed on a shaft 75. The plate 70a is provided with a plurality of spaced projections or lugs 70b along its inner surface for being received in corresponding recessed portions provided in the periphery of the lower seed plate 71 to thereby be driven by the seed plate 71. A gear 74 mounted on the end of the shaft 75 opposite from the gear 76 engages the teeth of the gear 72 for driving the upper seed plate 70. It will also be observed in Figure 4 that the hopper 52 has spaced openings in its bottom thereof to receive the respective gears 74, 76 so the same may properly drive the upper seed plate 70 and lower seed plate 71 in opposite directions to each other without interfering with the seeds in the hopper.

It will be observed that the opening for the gear 76 which drives the lower seed plate 71 is spaced a further distance from the axis of the seed hopper 52 than the opening to receive the gear 74. This particular arrangement permits the upper and lower seed plates 70, 71 to be driven by the gears 74, 76 without the parts interfering with each other when in rotation. The gear 63 is preferably not keyed or secured to the shaft 57 to enable the gear to be readily slipped off the end of the shaft and a larger or smaller gear to be substituted therefor dependent upon the speed of feed desired from the hopper and the type of hopper being driven. However, the shaft end receiving the gear 63 is provided with shoulder portions or is polygonal to rotate the gear therewith. To support the gear shaft 75, a bearing bracket 77 (as most clearly shown in Figure 5) is provided with bolts or other suitable means securing the same to the bottom surface of the base member 73. A bracket 78, having its opposite ends secured to the bracket 77, is provided for preventing the gear 63 from moving off the end of the shaft 57.

A bifurcated shaft supporting member 79 (Figures 4 and 5) is connected to the bracket 77 and receives the shaft bearing block 64 between its arms and is provided with suitable shaft locking means, such as a bolt 80, for passing between the bifurcated portion of the bearing block for maintaining the shaft 57 in proper elevated position for the gear 63 thereon to properly mesh with the gear 74 on the shaft 75.

In Figures 8 and 9, a second form of hopper 52b is shown in the form of a corn or pea type of double seed hopper having a rearwardly and downwardly sloping bottom wall. With this type of hopper, the gear 63 on the front end of the shaft 57 drives an angularly positioned driving gear 84 which meshes with a pair of gears 85, only one of which is shown in Figure 9. The latter gears 85 each drives a conventional seed feeding mechanism for feeding seeds from a corresponding compartment into a tubular passageway 83 which is common to both compartments of the hopper 52b. The two compartments are indicated generally by a partition 85c (Figures 8 and 9).

As illustrated in Figure 8, the pressing wheel 45 having the driving teeth 60 thereon has been changed to the opposite side or end of the axle 44 from the pressing wheel 45 shown in Figures 3, 4 and 10 to rotate the shaft 57 in an opposite direction from that shown in Figures 3, 4 and 10. This switching of the pressing wheels 55 for this double type of seed feed hopper is necessary to give the proper direction of rotation to the feeding gears in the double feed hopper 52b.

In Figures 10 and 11 is illustrated another or third form of hopper 52c. This type of hopper 52c also has a sloping bottom wall and is particularly adaptable for corn, peas or de-linted cotton seeds. In this arrangement the gear 63 on the end of shaft 57 engages a gear 90 which carries a seed plate 91 for feeding the seeds through an opening 92 in the hopper 52c into a seed passageway 93. A bifurcated shaft supporting member 94, similar to the bifurcated members 79 and 87 in Figures 5 and 8, respectively, is provided to maintain the shaft 57 in proper elevated position so the gear 63 thereon will properly mesh with the gear 90.

It is apparent that the simplicity of the mounting means for the driving shaft 57 for the various types of seed hoppers permits the changing of one type of hopper for another in a minimum of time by merely loosening the bolt 80 engaging the bifurcated portion of the shaft bearing block 64 and loosening the bolts 48, 49 for the hopper bracing members 47 and 50 and lifting the feed hopper 52, 52b or 52c upwardly and away from the carriage 32 of the seed planter along with the pairs of hopper braces 47, 50 which remain secured to the hopper by the bolts 51. Only a slight adjustment of the shaft retaining member 61 which engages the hub of the gear 56 on the shaft 57 is necessary when a different type of hopper is positioned on the chassis or carriage 32 of the seed planter.

As previously stated, for the double seed hopper 52b shown in Figures 8 and 9, the pressing or ground wheels 55 will be switched to impart rotation to the shaft 57 in an opposite direction to properly feed the seeds from the hopper 52b.

Although only three types of hoppers have been disclosed to illustrate the invention, it is apparent that many other types of seed hoppers may be utilized with the present invention without departing from the spirit of the invention.

It will therefore be apparent that the present invention permits the purchasing of only one type of seed planter and the interchanging of various types of seed hoppers thereon results in a considerable saving to the user.

In the drawings and specification there has been set forth several embodiments of the invention and, although specific terms are employed, they are used in a generic and descriptive sense only and not for purposes of limitation, the scope of the invention being defined in the claim.

I claim:

In a planter device having a single seed hopper provided with rotatable seed feeding means and wherein said single seed hopper may be interchanged with a double seed hopper provided with a pair of spaced apart rotatable seed feeding means adapted to be driven in the same direction as each other and in the same direction as the rotatable seed feeding means of the single seed hopper, said double seed hopper having a driving gear interposed between said pair of spaced apart rotatable seed feeding means and in driving relation therewith and thus requiring to be driven in an opposite direction from said pair of spaced apart rotatable seed feeding means in order to impart the desired direction of movement thereto, said planter device also having a pair of spaced interchangeable covering wheels and teeth provided on the inner face of one of said wheels; the combination therewith of a drive shaft, a gear provided on the lower end of said drive shaft for engaging the teeth on the inner face of said wheel, a gear mounted on the upper end of said shaft to be driven thereby, said gear being loosely mounted on said shaft and being in driving relation to the rotatable seed feeding means of the single seed hopper, means for raising and lowering the upper end of the shaft and for adjusting the angular relation of said shaft with respect to the hopper, the gear on the upper end of the shaft and the single seed hopper being readily removable to facilitate changing to a different gear and to the double seed hopper, whereby upon the covering wheels being interchanged, the pair of rotatable seed feeding means in the double seed hopper will be properly driven.

References Cited in the file of this patent

UNITED STATES PATENTS

| | | |
|---|---|---|
| 1,029,592 | Cole | June 18, 1912 |
| 1,086,548 | Meves | Feb. 10, 1914 |
| 1,185,671 | Hooker | June 6, 1916 |
| 1,321,293 | Drake | Nov. 11, 1919 |
| 1,557,856 | Luebbing | Oct. 20, 1925 |
| 1,729,535 | Brown | Sept. 24, 1929 |
| 2,167,023 | Cole | July 25, 1939 |
| 2,668,638 | Joy | Feb. 9, 1954 |

OTHER REFERENCES

Publication: McCormick-Deering Combination Planters No. HM-96, International Harvester, Chicago, Illinois, Oct. 8, 1945, pages 2, 4, 5 and 19.